United States Patent
Jones

(10) Patent No.: US 9,314,965 B2
(45) Date of Patent: Apr. 19, 2016

(54) WIRELAYING APPARATUS AND WIRELAYING METHOD FOR ELECTROFUSION WELDING

(71) Applicant: MSA Engineering Systems Limited, Halifax, Yorkshire (GB)

(72) Inventor: Morgan Jones, Thurmaston (GB)

(73) Assignee: MSA Engineering Systems Limited, Yorkshire (GB)

(*) Notice: Subject to any disclaimer, the term of this patent is extended or adjusted under 35 U.S.C. 154(b) by 222 days.

(21) Appl. No.: 14/099,507

(22) Filed: Dec. 6, 2013

(65) Prior Publication Data

US 2014/0096894 A1   Apr. 10, 2014

Related U.S. Application Data

(63) Continuation of application No. 12/666,477, filed as application No. PCT/GB2008/050487 on Jun. 24, 2008, now abandoned.

(30) Foreign Application Priority Data

Jun. 27, 2007  (GB) .................................. 0712430.8

(51) Int. Cl.
  *B29C 65/34* (2006.01)
  *B29C 70/82* (2006.01)
  (Continued)

(52) U.S. Cl.
  CPC .............. *B29C 65/342* (2013.01); *B29C 70/82* (2013.01); *B29D 23/005* (2013.01); *F16L 47/03* (2013.01); *F16L 47/28* (2013.01); *B29L 2031/246* (2013.01); *Y10T 156/12* (2015.01)

(58) Field of Classification Search
  CPC .......... B29C 3/32; B29C 3/34; B29C 65/342;
  B29C 70/82; B23C 2200/36; B23C 2200/363;
  B23D 3/02; F16L 47/28; F16L 47/03; B29D
  23/005; B29L 2031/246; Y10T 29/5122;
  Y10T 29/5124; Y10T 29/5187
  USPC ...... 29/564, 564.2, 563, 561, 566, 33 T, 33 F,
    29/33 S, 611, 56.6; 409/164, 165, 158
  See application file for complete search history.

(56) References Cited

U.S. PATENT DOCUMENTS

| 4,894,521 A | 1/1990 | Evans |
| 5,387,305 A | 2/1995 | Streng |

(Continued)

FOREIGN PATENT DOCUMENTS

WO   9718412   5/1997

OTHER PUBLICATIONS

International Search Report and Written Opinion dated Mar. 11, 2009 in PCT/GB2008/050487.

(Continued)

*Primary Examiner* — Jason L Vaughan
(74) *Attorney, Agent, or Firm* — Daniel A. Tanner, III; Prass LLP

(57) ABSTRACT

A wirelaying apparatus includes a tool arm with a tool head which carries a wirelaying tool. The tool has a cutting tip through which a wire is laid into a working surface of a workpiece. The workpiece is retained in a retainer and is moved relative to the wirelaying tool. In use, the cutting tip follows along an arcuate path while laying the wire into the working surface of the workpiece. Thus, more complex wirelaying configurations are achieved, such as a bi-helical wirelaying pattern in a generally cylindrical pipe fitting or a bi-spiral wirelaying pattern in a semi-cylindrical saddle coupler pipe fitting.

16 Claims, 8 Drawing Sheets

(51) Int. Cl.
*B29D 23/00* (2006.01)
*F16L 47/03* (2006.01)
*F16L 47/28* (2006.01)
*B29L 31/24* (2006.01)

(56) References Cited

U.S. PATENT DOCUMENTS

| | | |
|---|---|---|
| 5,708,251 A | 1/1998 | Naveh |
| 6,530,139 B1 | 3/2003 | Jones et al. |
| 6,557,235 B1 | 5/2003 | Katz et al. |
| 6,751,840 B2 | 6/2004 | Jones et al. |
| 2003/0053875 A1 | 3/2003 | Pasquetto |
| 2005/0005417 A1 | 1/2005 | Jones |
| 2010/0263786 A1 | 10/2010 | Jones |

OTHER PUBLICATIONS

Restriction Requirement dated Nov. 5, 2012, in parent U.S. Appl. No. 12/666,477, filed Mar. 15, 2010.
Response to Restriction Requirement dated Dec. 4, 2012, in parent U.S. Appl. No. 12/666,477, filed Mar. 15, 2010.
Office Action dated Mar. 28, 2013, in parent U.S. Appl. No. 12/666,477, filed Mar. 15, 2010.
Response to Office Action dated Jun. 26, 2013, in parent U.S. Appl. No. 12/666,477, filed Mar. 15, 2010.
Final Office Action dated Aug. 6, 2013, in parent U.S. Appl. No. 12/666,477, filed Mar. 15, 2010.

WIRELAYING APPARATUS AND WIRELAYING METHOD FOR ELECTROFUSION WELDING

RELATED APPLICATION DATA

This application is a continuation of U.S. patent application Ser. No. 12/666,477, filed Mar. 15, 2010, entitled "Wirelaying Apparatus and Wirelaying Method For Electrofusion Welding," now pending, which application is a §371 application of International Application No. PCT/GB2008/050487, filed Jun. 24, 2008, and which claims priority to GB0712430.8, filed Jun. 27, 2007. Each of these applications is incorporated herein by reference in its entirety.

FIELD OF THE INVENTION

The present invention relates in general to a wirelaying apparatus and a wirelaying method. More particularly, the invention relates to an apparatus and method for laying a wire filament for electrofusion welding.

BACKGROUND

In the related art, electrofusion welding is commonly used to join pipes, such as plastics material pipes for water or natural gas, into a pipe fitting. A wire filament (i.e. a resistance heating wire) is securely embedded into the fitting. In use, the pipes are inserted into the fitting, suitably with a tight friction fit, and the wire filament is heated by passing current through it, until the pipes are welded into the fitting with a strong, reliable, gas-impermeable joint.

Traditionally, the wire filament is first formed into a coil or sleeve and is then molded into the fitting. However, more recently, various forms of wirelaying apparatus have been developed that lay the wire directly into the fitting. These wirelaying apparatus produce superior fittings but face a number of difficulties, particularly when it is desired to produce more complex wirelaying configurations.

WO-A-99/33619 (MSA Engineering/Jones, et al.) discloses a wirelaying apparatus wherein the wire filament is laid into the interior bore surface of a cylindrical pipe fitting. A tool head carries a wirelaying tool that has a cutting tip to open a cut in the surface of the fitting. The cutting tip also has an aperture that delivers the wire directly into the cut through the cutting tip. A flap closer then closes the cut over the inserted wire, all in one integrated tool. The fitting is rotated and the tool head advances into the fitting along a linear path to form a helical wirelaying pattern. This unidirectional or "single" wirelaying process lays the wire in a single direction. It is only possible to alter the pitch of the helical path by altering the rate of the relative linear advancement of the tool head with respect to the fitting.

WO-A-99/33619 also discloses another embodiment of the apparatus for "double" or bidirectional wirelaying. Here, in this alternate embodiment of the related art, the cutting tip is a separate component that is rotatable about the wire filament using a rack and pinion arrangement, such that a cutting direction may be changed whilst the cutting tip is still engaged in the surface of the fitting. This embodiment allows wirelaying in a double helical path. However, the cutting tip is vulnerable and may break. If the cutting tip breaks, the wirelaying process must be aborted for that fitting and the process restarted with a new cutting tip and a new fitting, which is time-consuming and wasteful.

Also in the related art, WO-A-97/18512 (Compucraft/Friedman, et al.) discloses an apparatus for embedding a wire into many different types of fittings, including laying wire into a saddle coupler type pipe fitting using a more complex bi-spiral pattern. The apparatus includes a multi-jointed arm that supports interchangeable heads. First, the head carries a laser-powered heat grooving mechanism that applies concentrated heat to the surface to form a groove in the desired pattern. Then, the heat grooving mechanism is swapped for a wire inserting mechanism which retraces the same pattern over the surface while pressing the wire into the groove. However, the apparatus is impractical. Despite these and many other developments in the related art, in practice most saddle couplers are still produced using fusion pads. Here, U.S. Pat. No. 4,684,428 (Ewen et al) discloses one example method for making such fusion pads for a saddle coupler.

Hence, there is still a need to provide an improved wirelaying apparatus and wirelaying method for laying wire into a workpiece which has complex contours (such as a saddle coupler) and/or in a complex pattern (such as a bi-helical or bi-spiral pattern).

SUMMARY OF THE DISCLOSURE

According to the present invention there is provided a wirelaying apparatus and a wirelaying method as set forth in the appended claims. Other features of the invention will be apparent from the dependent claims, and the description which follows.

In one aspect of the present invention there is provided a wirelaying apparatus for laying a wire into a working surface of a workpiece. The apparatus comprises a retainer for retaining the workpiece; a wirelaying tool having a cutting tip for, in use, making a cut into the working surface of the workpiece in response to relative movement of the wirelaying tool with respect to the retainer, wherein the wirelaying tool comprises an aperture for delivering a wire through the cutting tip directly into the cut in the working surface; and a tool head arranged to carry the wirelaying tool mounted thereon and to move the wirelaying tool relative to the retainer, wherein the tool head is arranged to move the wirelaying tool to, in use, make the cutting tip follow along an arcuate path while laying the wire into the working surface of the workpiece.

In one aspect, the tool head is arranged to move the cutting tip of the wirelaying tool about a center of rotation, while the cutting tip is maintained offset on a tangential line from the center of rotation to move along the arcuate path.

In one aspect, the retainer is arranged to move on a linear Z axis with respect to the tool head and to rotate the workpiece about a rotational A axis substantially normal to the linear Z axis. Further, the tool head is arranged to move on orthogonal X and Y linear axes with respect to the retainer and to rotate the tool head about a rotational C axis substantially normal to a plane of the X and Y linear axes.

In one aspect, the apparatus includes two or more stations. One of the stations is a wirelaying station. The wirelaying station may include a tool arm to carry and move the tool head. Another of the stations is a milling station which includes a milling cutter to mill the working surface of the workpiece. Suitably, the retainer is arranged to move in use between the wirelaying station and the milling station while retaining the workpiece. That is, the apparatus is arranged to carry the workpiece from one of the stations to another of the stations without removing the workpiece from the retainer.

In one aspect, the apparatus is arranged to form a bi-spiral pattern, such as in a saddle coupler workpiece, by first moving the wirelaying tool in an arc of decreasing radius about a notional center point to form a first spiral pattern, secondly moving the wirelaying tool in an arc of 15 substantially constant radius about a center of rotation to form a turnaround, and thirdly moving the wirelaying tool in an arc of increasing radius about the notional center point to form a second spiral pattern interleaved with the first spiral pattern.

In one aspect, the tool head further comprises a rotating tool holder arranged to rotate the wirelaying tool with respect to the tool head. Here, the rotating tool holder rotates the cutting tip along an arcuate path with respect to a center of rotation or rotary axis R. The retainer may rotate the workpiece, such as a generally cylindrical pipe fitting, while the tool head advances along a liner axis. Suitably, the linear axis is parallel to the rotary axis of the retainer. Suitably, the rotary axis of the retainer is substantially normal to the rotary axis R of the rotating tool holder.

In one aspect, a support arm is arranged to perform a first relative rotation and a first relative linear movement with respect to the retainer, thereby laying the wire into the interior bore surface along a first helical path from a starting point to a turnaround point. The rotatable tool holder is arranged to rotate the wirelaying tool along an arcuate path through an angle of substantially 180°, thus laying the wire in an arc at the turnaround point. The support arm is arranged to perform a second relative rotation and a second relative linear movement with respect to the retainer, thereby laying the wire along a second helical path from the turn-around point back towards the starting point, wherein the second helical path is interleaved with the first helical path to form a double helical coil.

In another aspect of the present invention there is provided a wirelaying apparatus for laying a wire into an interior bore surface of a hollow cylinder. A retainer is arranged to retain the hollow cylinder. A support arm is arranged for relative linear movement and relative rotation with respect to the retainer, such that in use the support arm is arranged to enter into the hollow cylinder during relative rotation of the hollow cylinder about its longitudinal axis. A tool head is carried at one end of the support arm, and a wirelaying tool is detachably mounted to the tool head. The wirelaying tool comprises a cutting tip arranged to form a cut into the interior bore surface of the hollow cylinder in response to said relative linear movement and said relative rotation, and has an aperture for delivering a wire through the cutting tip directly into the cut in the interior bore surface. A rotatable tool holder is arranged to rotate the wirelaying tool with respect to the tool head about an axis of rotation such that the cutting tip describes an arc about the axis of rotation of the wirelaying tool while laying the wire in an arcuate path.

In one aspect, the wirelaying tool comprises a body and the cutting tip projects from the body for making the cut into the working surface of the workpiece. In one aspect, the wirelaying tool further comprises a flap closer for closing the cut thereby enclosing the wire in the cut, and the cutting tip, the body, and the flap closer are integrally formed.

In another aspect of the present invention there is provided a method for laying wire into a working surface of a workpiece, comprising the steps of: forming a first wirelaying pattern by opening a cut with a cutting tip of a wirelaying tool into the working surface of the workpiece by relative movement of the workpiece with respect to the wirelaying tool, feeding the wire into the cut through the cutting tip of the wirelaying tool, and closing the cut thereby enclosing the wire in the cut; rotating the wirelaying tool with respect to the workpiece such that a cutting direction of the wirelaying tool is changed while continuously laying wire into the working surface, wherein the cutting tip rotates along an arcuate path around a center of rotation while laying the wire into the working surface; and forming a second wirelaying pattern by a further relative movement of the workpiece with respect to the wirelaying tool. In one aspect, the second wirelaying pattern is interleaved with the first wirelaying pattern and the change of direction reverses the cutting direction of the wirelaying tool.

In one aspect, the method is for forming a bi-spiral wirelaying pattern, such as in a saddle coupler workpiece, by first moving the wirelaying tool in an arc of decreasing radius about a notional center point to form a first spiral pattern, secondly moving the wirelaying tool in an arc of substantially constant radius about a center of rotation to form a turnaround, and thirdly moving the wirelaying tool in an arc of increasing radius about the notional center point to form a second spiral pattern interleaved with the first spiral pattern.

In one aspect, the method is for laying wire into an interior bore surface of a hollow cylinder. Here, the step of forming a first wirelaying pattern includes forming a first helical coil by opening a cut with a cutting tip of a wirelaying tool into the interior bore surface of the hollow cylinder following relative rotation of the hollow cylinder with respect to the wirelaying tool, feeding the wire into the cut through the cutting tip of the wirelaying tool, and closing the cut using the wirelaying tool thereby enclosing the wire in the cut; the rotating step includes rotating the wirelaying tool with respect to a tool head such that a cutting direction of the wirelaying tool is reversed while continuously laying wire into the interior bore surface, wherein the cutting tip rotates along an arcuate path around an axis of rotation of the wirelaying tool; and the step of forming a second wirelaying pattern includes forming a second helical coil interleaved with the first helical coil following reversed relative rotation of the hollow cylinder with respect to the wirelaying tool.

In another aspect of the present invention there is provided a method for laying wire into an interior bore surface of a hollow cylinder, comprising the steps of: forming a first helical coil by opening a cut with a cutting tip of a wirelaying tool into the interior bore surface of the hollow cylinder following relative rotation of the hollow cylinder with respect to the wirelaying tool, feeding the wire into the cut through the cutting tip of the wirelaying tool, and closing the cut using the wirelaying tool thereby enclosing the wire in the cut; rotating the wirelaying tool with respect to a tool head such that a cutting direction of the wirelaying tool is reversed while continuously laying wire into the interior bore surface, wherein the cutting tip rotates along an arcuate path around an axis of rotation of the wirelaying tool; and forming a second helical coil interleaved with the first helical coil following reversed relative rotation of the hollow cylinder with respect to the wirelaying tool.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Two example embodiments of the present invention will be discussed in the following detailed description. Both embodiments are able to produce a pipe fitting ready for electrofusion welding, by laying a wire filament into the pipe fitting. The first example embodiment concerns an improved apparatus and method for laying wire such as in a bi-helical pattern into the interior bore surface of a generally cylindrical pipe fitting—e.g. a straight coupler, elbow, reducer or T-coupler. The second example embodiment concerns an improved apparatus and method for laying wire into other forms of fittings, most particularly non-cylindrical fittings or semi-cylindrical fittings such as a saddle coupler. However, the features of the present invention are also applicable to other industrial applications and other working environments. Thus, pipe fittings are only one example of the type of workpiece that can be produced by the exemplary wirelaying apparatus and wirelaying methods discussed herein.

Figure 1:
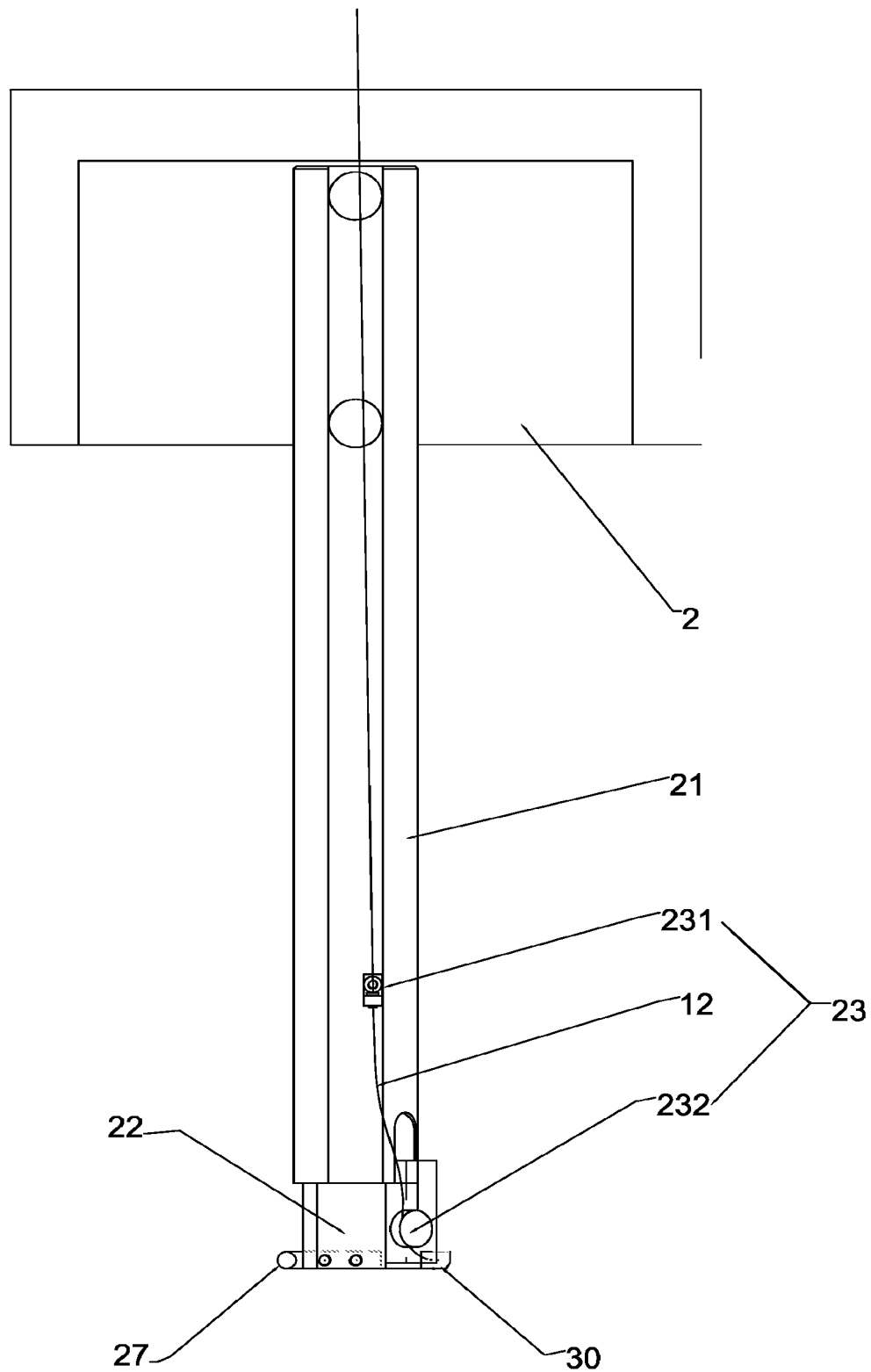
FIG. 1 is a plan view showing a tool arm of a first exemplary wirelaying apparatus.

Referring to FIG. 1, the exemplary wirelaying apparatus 2 comprises an elongate support arm or tool arm 21 which is connected to and supports a tool head 22, suitably at one end of the tool arm 21. A wirelaying tool 30, which will be discussed in more detail later, is detachably mounted on the tool head 22. A wire supply unit 23 supplies a wire filament 12 (e.g. copper or other suitable alloy resistance wire) to the wirelaying tool 30 during the wire-laying process. In the illustrated example embodiment, the wire supply unit 23 includes one or more guides 231, 232 arranged on the tool arm 21 and/or on the tool head portion 22 to guide the wire 12 from a supply such as a wire reel (not shown) into the wirelaying tool 30.

In the exemplary embodiment, the wirelaying apparatus 2 comprises a Computer-Numerically-Controlled (CNC) machine and the tool arm 21 is mounted in a tool-holder of the machine. Meanwhile, a generally cylindrical pipe fitting (not shown) is mounted, for example, on a rotating spindle of the machine. A relative linear movement causes the tool arm 21 to advance into (or retract out of) a bore of the fitting, while a relative rotational movement rotates the fitting with respect to the tool arm 21.

Suitably, a reaming operation is first performed on the fitting, conveniently using a reaming cutter 27 carried on the tool head 22. This ensures that the bore-surface is consistently even and is smoothly cylindrical for the wire-laying operation. Also, the bore-surface may be softened or pre-warmed by the reaming operation to improve the following wirelaying operation.

For the wirelaying process, the CNC machine 2 causes the fitting to rotate such as at approximately 500 to 600 revolutions per minute (or other suitable speed) and the wirelaying tool 30 is brought into contact with the interior bore-surface of the fitting to form a cut or groove therein. By moving the tool 30 along the pipe fitting at a particular rate, combined with the relative rotation of the pipe fitting, a helical groove of desired pitch is formed.

Figure 2:
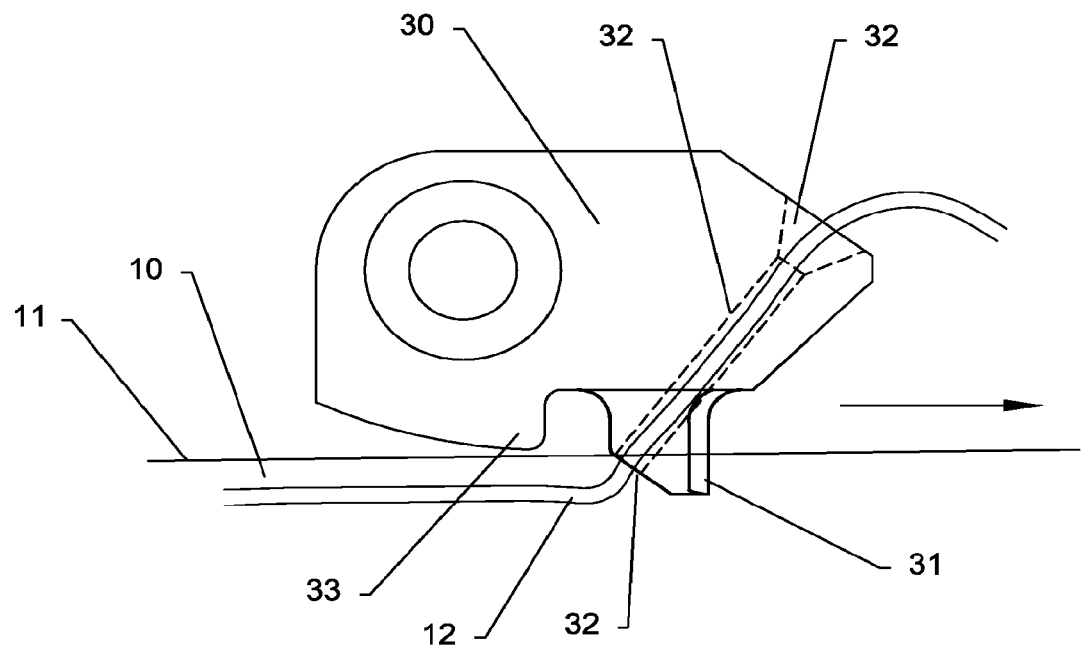
FIG. 2 is a detailed cross-sectional side view of a wirelaying tool in use.

As illustrated in more detail in FIG. 2, the groove is suitably formed substantially normal to the working surface 11 of the fitting 10 by a cutting tip 31. The wire 12 is fed through a feed aperture 32 which passes through the main body of the tool 30 and exits the cutting tip 31 directly into the open groove. Optionally, the tool 30 further includes a flap closer 33. Alternatively, the flap closer may be carried separately on the tool head 22 (see FIG. 1). As the cut is formed, the cutting tip 31 displaces a flange of plastics material. This displaced plastics material meets the flap closer 33, which urges and flattens the displaced material back over the freshly cut groove to thereby at least partly cover the laid wire 12 The flap closer 33 suitably extends across the tool 30, such as at substantially 90 degrees to the cutting direction. The exemplary wire-laying process is thus performed continuously and involves the temporary opening of a groove (cut), the laying of wire in the groove, and the immediate enclosing of the wire in the groove, all by the action of the integrated wirelaying tool 30.

Figure 3:
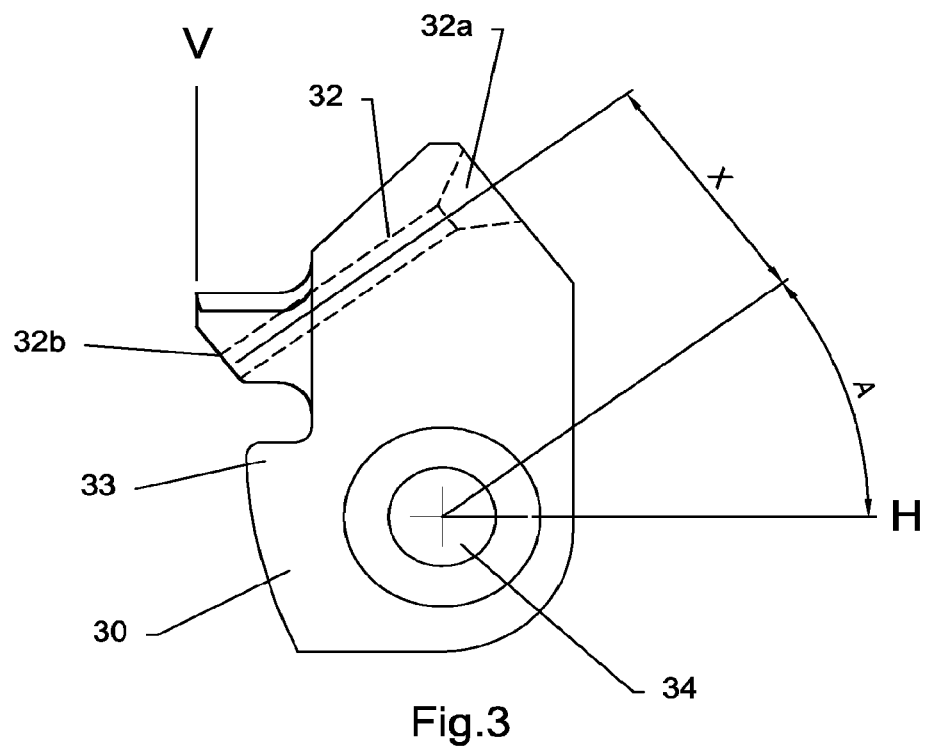
FIG. 3 is a detailed side view of the wirelaying tool of FIG. 2.

FIG. 3 is a side view showing the wirelaying tool 30 in more detail. In FIG. 3, the wire guide aperture 32 extends from an opening 32a at the top and rear of the tool 30 to a second opening 32b in a face of the wirelaying tool which lies, in use, in the cut. The aperture 32 is elongate and linear. The aperture lies at an angle marked A with respect to a notional horizontal axis H. This horizontal axis H is normal to a vertical plane V aligned with a forward cutting edge of the cutting tip and, in use, normal to a plane at the bottom of the cut at the lowermost (deepest) point of the cutting tip 31. In FIG. 3, the angle A is at least 35°. Preferably, the angle is in the range of 35° to 40°. Most preferably, the angle A is 37°, with a tolerance of about ±0.1°. Hence, the wire 12 enters the cut at a predetermined angle of (90-A) degrees with respect to the plane V at the bottom of the cut. In the exemplary embodiments, this predetermined angle is therefore less than 55°, preferably in the range of substantially 55° to 50°, and most preferably about 53°. This angle A substantially improves the flow of the wire 12 into the cut opened by the cutting tip 31. In particular, friction between the wire 12 and the tool 30 is significantly reduced, most especially by reducing friction between the wire and the inside of the aperture 32.

As also shown in FIG. 3, the wirelaying tool 30 suitably comprises a mounting portion 34, such as an aperture through the main body of the tool. This mounting portion 34 allows the tool 30 to receive a fixing such as a screw or a bolt, for detachably mounting the tool 30 to the head portion 22 of the tool arm 21 shown in FIG. 1.

Figure 4:
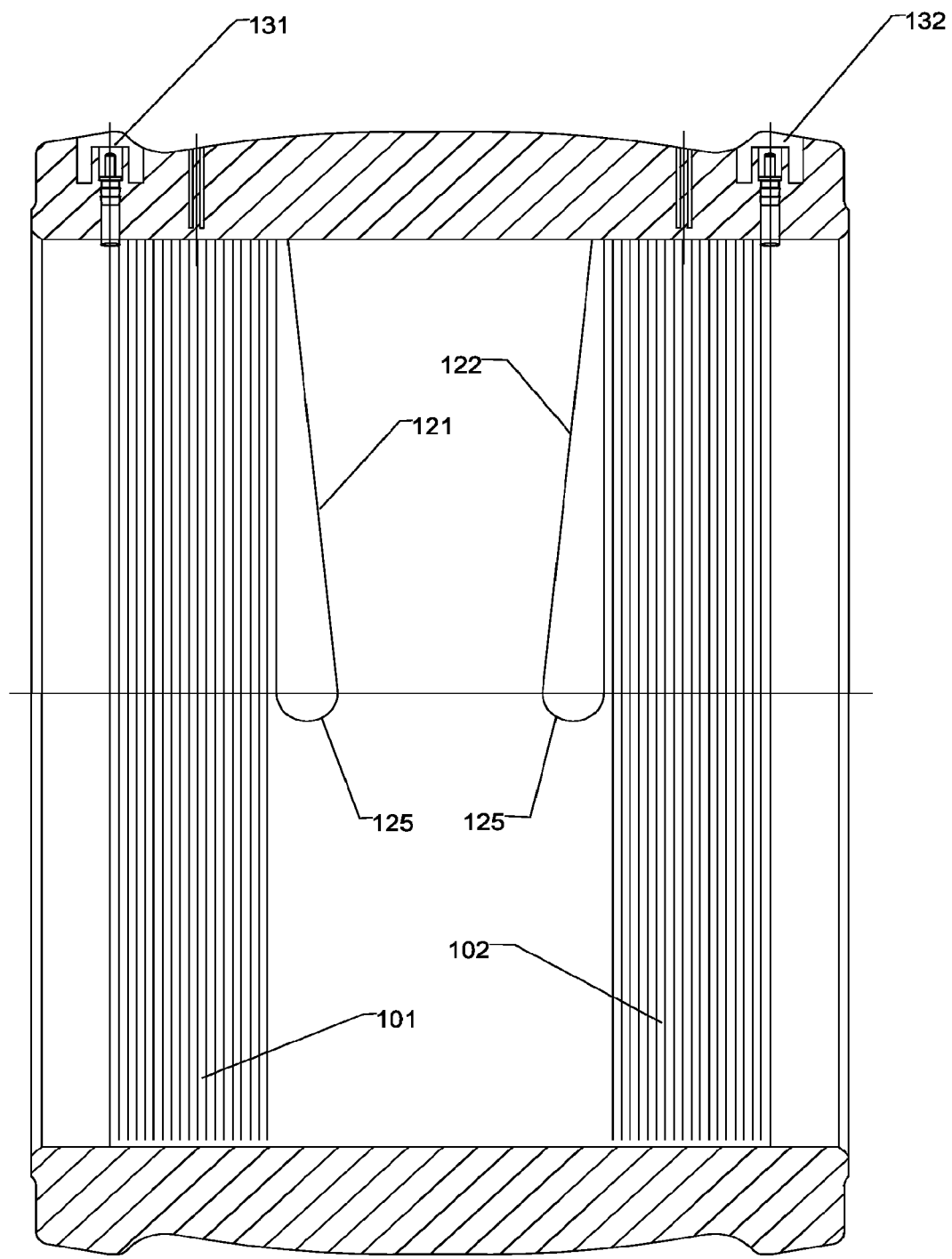
FIG. 4 shows a pipe fitting in cross section to illustrate a double wirelaying operation.

FIG. 4 shows a pipe fitting in cross section to illustrate a double wirelaying operation performed by the exemplary wirelaying apparatus.

In FIG. 4, two separate wire filaments 121, 122 are laid into the pipe fitting 10 to form separate first and second fusion zones 101, 102, in this case at either end of the fitting 10. The 5 first wire filament 121 is laid in a double helical coil within the first fusion zone 101 and both ends of the first wire filament 121 are exposed at a pair of terminals 131. Similarly, the second wire filament 122 is laid in a double helical coil in the second fusion zone 102, starting and returning to a second pair of terminals 132.

Looking in more detail at the first fusion zone 101, the double helical coil is formed starting from the first terminal point 131 by initially laying the wire filament 121 in an inward helical coil having a double-spaced pitch. Then, the direction of cutting is reversed at a turnaround point 125, and a second outward helical coil is laid between the pitch of the first inward helical coil, until the wire filament 121 returns to the first terminal point 131. Hence, the wirelaying apparatus needs to be able to reverse the direction of cutting in order to lay a continuous wire filament in both the first inward helical coil and the second outward helical coil.

This arrangement is particularly useful when, for example, it is desired to provide the two or more separate fusion zones 101, 102 in a pipe fitting so that joints may be made separately at different points in time. A first joint is made using the first fusion zone 101. Then, later, a second joint is made using the second fusion zone 102. The double helical coil arrangement maybe used with any form of pipe fitting, including for example a sleeve, reducer, T-shaped, elbow or cap-end pipe fitting. This arrangement also helps to reduce welding voltages by welding only one zone of the fitting at a time, thereby improving safety.

Figure 5:
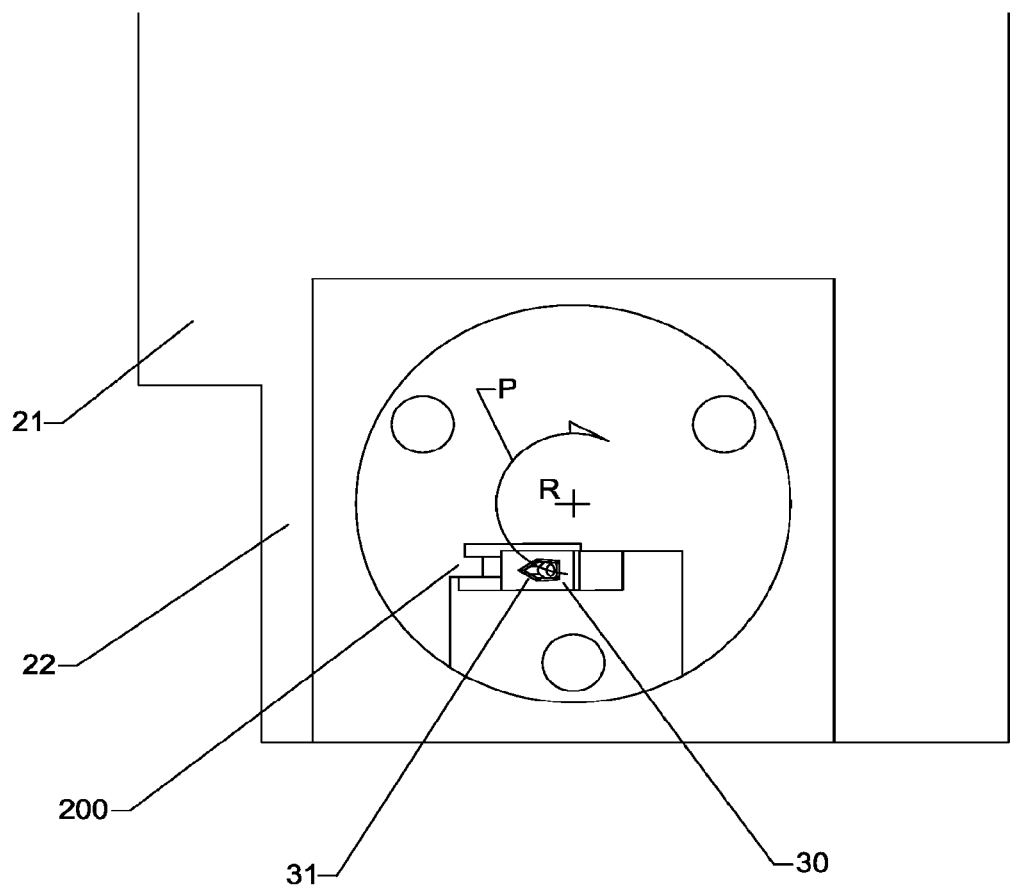
FIG. 5 is a plan view showing the wirelaying apparatus arranged to perform a double wirelaying operation.
Figure 6:
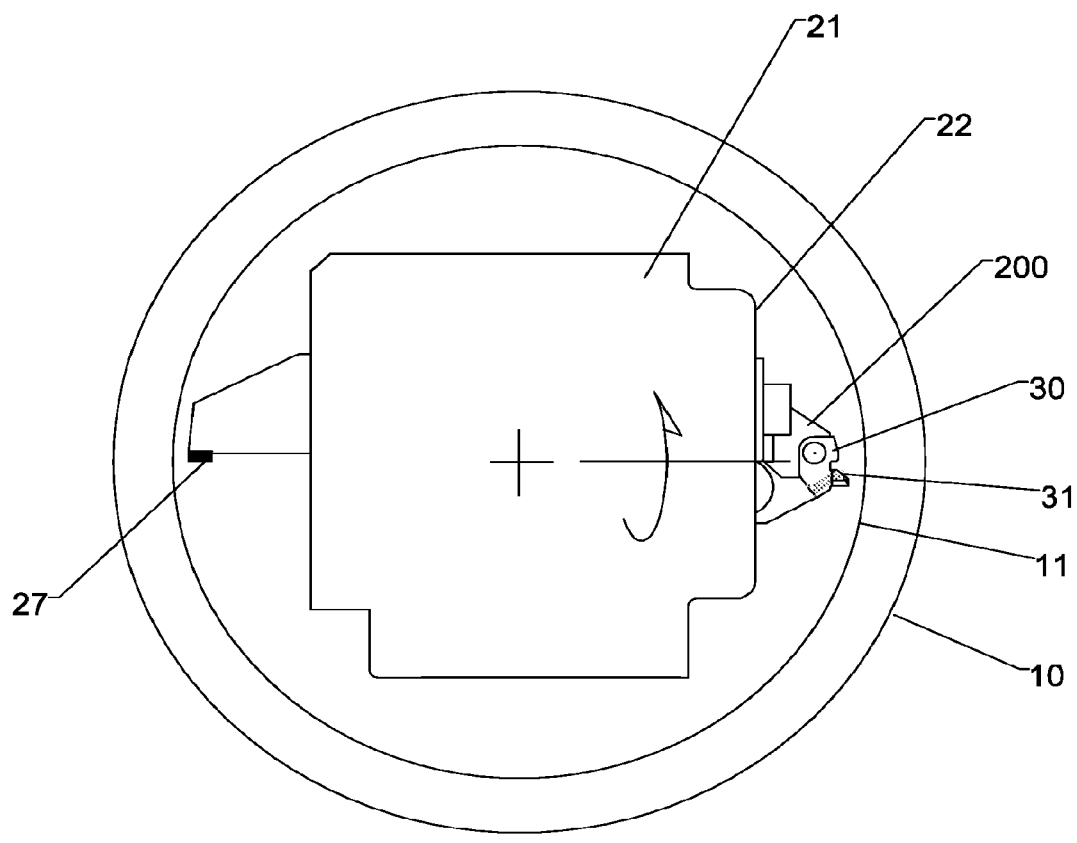
FIG. 6 is an end elevational view showing the wirelaying apparatus arranged to perform the double wirelaying operation.

FIGS. 5 and 6 show the exemplary first embodiment of the wirelaying apparatus in more detail. In particular, this first exemplary embodiment is arranged to perform the double helical wirelaying operation noted above to produce the bi-helical wirelaying pattern illustrated in FIG. 4.

FIG. 5 is an elevational view of the tool head 22 at the distal end of the support arm 21. As shown in FIG. 5, the tool head 22 includes a rotating tool holder 200. The wirelaying tool 30 is removeably mounted within the rotating tool holder 200 such as by a bolt or screw fixing through the mounting aperture 34 as shown in FIG. 3.

FIG. 6 is a sectional view of the support arm 21 and the tool head 22. Here, the wirelaying tool 30 is shown ready to be engaged with the interior bore surface 11 of the generally cylindrical pipe fitting 10. Suitably, a lateral movement of the arm 21 towards the fitting 10 will engage the cutting tip 31 into the working surface 11.

The rotating tool holder 200 is arranged to rotate the wirelaying tool 30 about an axis of rotation, which is marked 'R' in FIG. 5. Notably, the wirelaying tool 30 is mounted in the tool holder 200 such that the cutting tip 31 is offset from the axis R. That is, the cutting tip 31 is offset on a tangential line with respect to the axis R at the center of rotation. Thus, the cutting tip 31 moves in an arc about the center of rotation R and rotation of the tool holder 200 causes movement of the cutting tip 31 along an arcuate path P. Here, the direction of wirelaying may be changed while the cutting tip 31 is still engaged with the surface of the fitting 10, by rotating the tool 30 and thus moving the cutting tip 31 along the arcuate path P.

To lay the bi-helical pattern shown in FIG. 4, firstly an inward helical coil is laid at a double-width pitch through relative rotation and a relative linear movement of the wirelaying tool 30 with respect to the pipe fitting 10, until the wire is laid along a wide-pitched first helical path from the starting point at the terminal 131 to the turn-around point 125. This relative linear and rotational movement is then stopped. Next, the rotating tool holder 200 rotates the wirelaying tool 30 along the arcuate path P through an angle of ideally 180°, thus laying the wire 121 in an arc at the turn around point 125. The wire is still laid into the interior bore surface while traversing along this arcuate path. The relative rotation and linear movement of the pipe fitting 10 is then reversed to continue laying the wire now in the opposite direction as an outward helical coil from the turnaround point 125 back to the terminal 131. Here, the horizontal displacement is controlled such that the outward helical coil is laid between the pitch of the inward helical coil, thus forming a double helical coil in the desired bi-helical pattern.

In the exemplary embodiments, the rotatable tool holder 200 is arranged to rotate the tool 30 smoothly and continuously through the desired motion. Hence, the wire is laid without any additional strain at the turnaround, which avoids a break in the wire.

In the exemplary embodiment, the wirelaying tool 30 is adjustable by the rotating tool holder 200 to any desired angle. Thus, this rotational ability, when combined with appropriate linear and rotational movements of the arm with respect to the fitting or other workpiece, allow many different wirelaying paths to be achieved in addition to the double helical path discussed here as a specific example.

A second exemplary embodiment of the wirelaying apparatus will now be described in detail referring to FIGS. 7 to 12. Those components which have already been described with reference to the first embodiment have been given the same reference numerals and will not be described again here.

Figure 7:
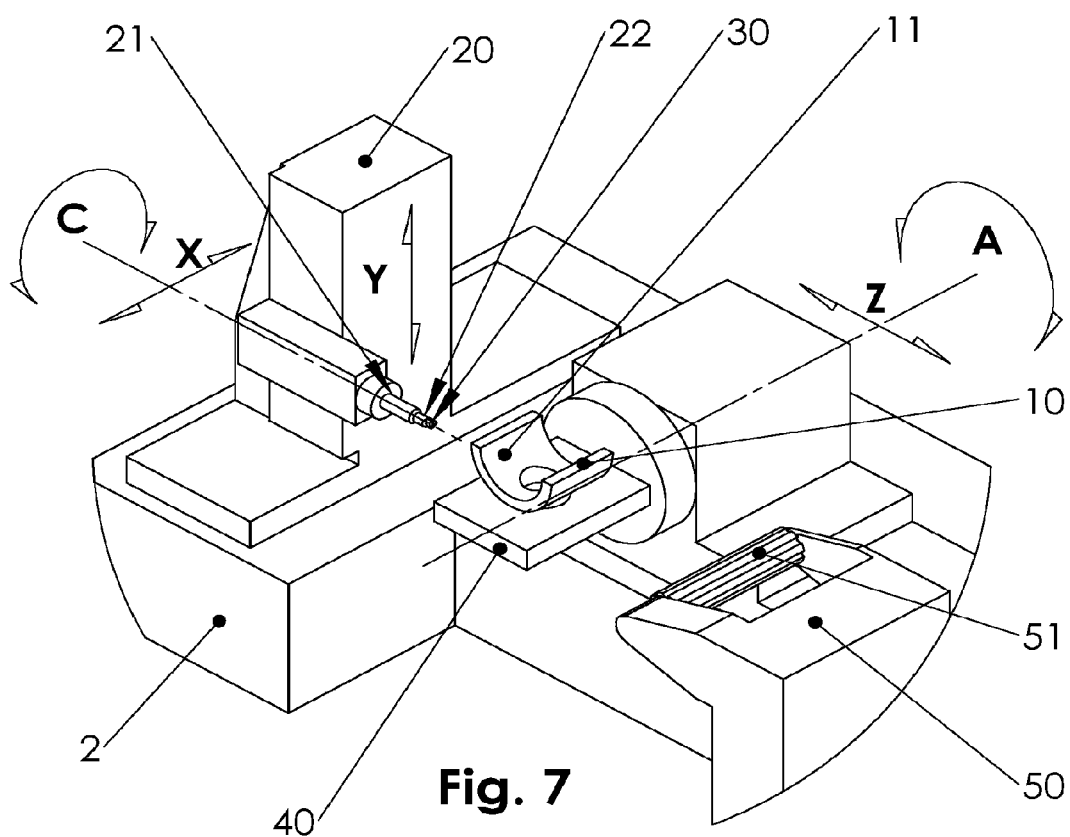
FIG. 7 is a schematic perspective view showing a second exemplary wirelaying apparatus.

FIG. 7 is a schematic perspective view of the wirelaying apparatus 2 of the second exemplary embodiment. The apparatus 2 includes two working stations, namely a wirelaying station 20 and a milling station 50, which here are conveniently arranged at either end of a Z axis. A retainer 40 is arranged to travel between the two stations 20, 50 by moving along the Z linear axis while retaining a workpiece 10. In this embodiment the workpiece is a saddle coupler type pipe fitting that has a curved inner surface 11 of a radius designed to fit around a pipe of corresponding external diameter. It is desired to lay the wire into this curved inner surface so that, when the wire is heated, the saddle coupler 10 is electrofusion welded to the pipe.

The wirelaying station 20 includes a tool arm 21 that is moveable along orthogonal X and Y axes. In the exemplary arrangement, the XY plane lies substantially normal to the Z linear axis. The tool arm 21 suitably carries a tool head 22 at a distal end thereof and a wirelaying tool 30 (of the type shown particularly in FIGS. 2 & 3) is removeably mounted to the tool head 22. Further, the tool arm 21 is rotatable about a C axis which is suitably normal to the XY plane and substantially parallel to the Z linear axis. That is, the tool arm 21 rotates generally about its longitudinal axis, to give a rotational axis C. Further, the retainer 40 is rotatable about an A rotation axis, which here is normal to the Z axis and is suitably parallel to the X axis.

The milling station 50 includes a milling tool or cutter 51 that is arranged to mill the working surface 11 of the fitting 10. Conveniently, the milling tool 51 is mounted in a fixed position and rotates generally parallel to the A axis.

In use, the retainer 40 suitably begins in a loading/unloading position substantially centrally between the two stations 20, 50 and a new fitting 10 is loaded into the retainer 40. Here, the fitting 10 is suitably molded, machined or otherwise fabricated elsewhere (e.g. on other machines nearby or even in another country) and then brought to the wirelaying apparatus 2. Suitably, the fitting 10 is inserted into the retainer 40 by a downward vertical movement, and thus gravity assists the fitting 10 to settle into the retainer 40. The fitting 10 is then secured in the retainer 40 such as by a clamping mechanism (not shown).

Next, the retainer 40 takes the fitting 10 to the milling station 50. As noted above, the retainer 40 has freedom of movement in the Z linear axis and the A rotation axis. In use, the 25 retainer 40 is arranged to move the fitting 10 about the milling cutter 51 to mill the working surface 11. Notably, any swarf is localised at the milling station 50 and so does not interfere with the wirelaying station 20.

The retainer 40 now takes the fitting 10 to the wirelaying station 20, where the wire is laid into the working surface 11 in a desired pattern as will be described in more detail below. The fitting 10 preferably remains in the retainer 40 while transferring from the milling station 50 to the wirelaying station 20. Advantageously, the wirelaying apparatus 2 coordinates the milling operation with the wirelaying operation. Both operations occur on the same machine and thus use the same reference points for location of the workpiece with respect to the milling station 50 and the wirelaying station 20. Inevitably, there will be manufacturing tolerances in the fitting 10 and slight variations in position when mounting the fitting 10 to the retainer 40. The preparatory milling operation allows the working surface 11 to be positioned accurately with respect to reference coordinates that are fixed in relation to the machine 2, and these same reference coordinates are still valid when the fitting 10 is transferred to the wirelaying station 20 by the retainer 40.

When the wirelaying has been completed, the retainer 40 carries the fitting 10 away from the wirelaying station 20 back to the central loading/unloading area. Here, the retainer 40 may rotate the fitting 10 such as to allow access to the rear of the fitting (or any other suitable angle). It is often desired to pull the free ends of the wire through the fitting 10 to a terminal point on an opposite side of the fitting. Conveniently, the retainer 40 rotates the fitting 10 to enable access for this pulling operation. The finished fitting 10 may then be unclamped and unloaded from the retainer 40, and the next new fitting inserted.

Optionally, a second milling operation is performed at the milling station 50 before removing the fitting 10 from the retainer 40. This second milling action is helpful in returning the working surface 11 to a smooth finish and/or in removing any excess material built up on the working surface 11 by volume displacement during the wirelaying operation.

Figure 8:
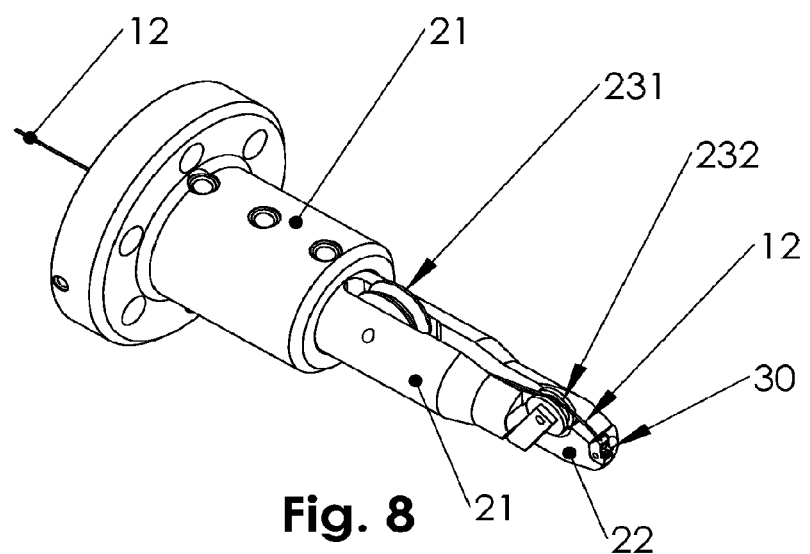
FIG. 8 is a perspective view of a tool arm of the second exemplary wirelaying apparatus.

FIG. 8 is a perspective view of the tool arm 21 in more detail. Here, the wire guide unit 23 includes wire guide wheels or pulleys 231 and 232 which guide the wire 12 to the wirelaying tool 30. The wirelaying tool 30 is removeably inserted into the head portion 22 at an end face of the tool arm 21 and, in this second exemplary embodiment, the tool 30 is held fixedly with respect to the tool arm 21. This arrangement is well adapted to withstand the pressures which arise during the wirelaying process. Also, the apparatus is relatively rigid, in order to lay the wire without suffering any unintended deviations from a desired wirelaying pattern.

Figure 9:
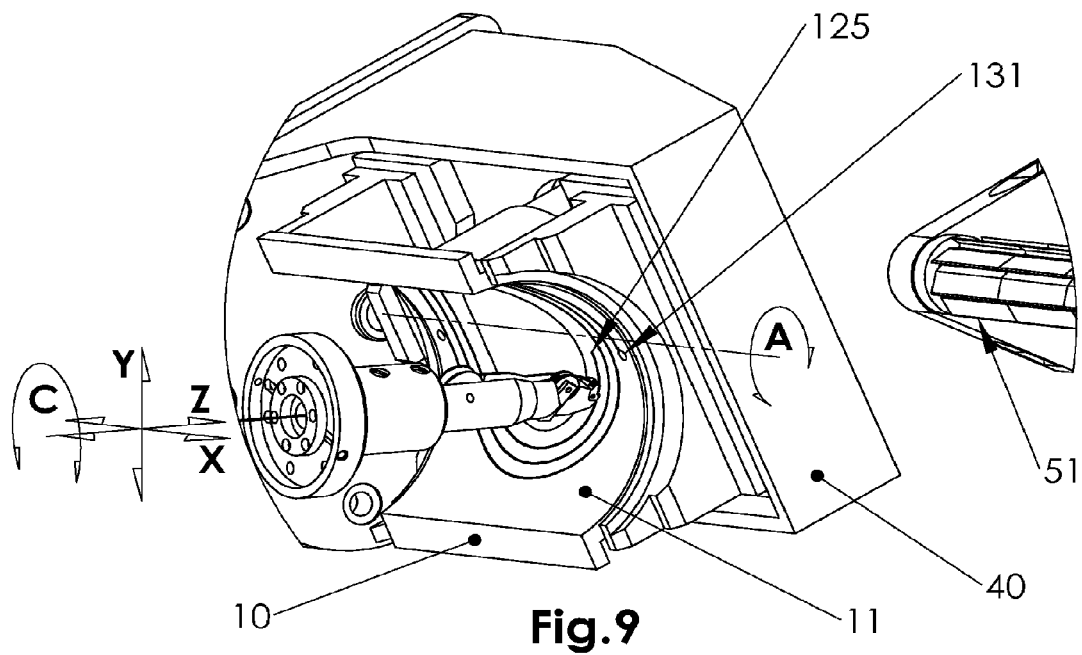
FIGS. 9, 10 & 11 are perspective views showing the second exemplary wirelaying apparatus in use.

FIG. 9 is a detailed perspective view of the tool arm 21 in use while laying wire into the saddle coupler 10 in the retainer 40. As shown in FIG. 9, in this exemplary embodiment the tool arm 21 is arranged to move in one rotary axis (the C-axis) and in first and second linear axes (the X-axis and Y-axis). Meanwhile, the retainer 40 is arranged to move in a second rotary axis (the A-axis) and a third linear axis (the Z-axis). Thus, there are five axes of relative movement between the fitting 10 and the wirelaying tool 30. Coordinating these relative movements achieves the desired wirelaying pattern into the fitting or workpiece 10. In this case, it is desired to follow the curved contours of the interior surface 11 of the saddle fitting 10 with a bi-spiral wirelaying pattern.

As shown in FIG. 9, the apparatus first lays an inward spiral, starting at a terminal 131 and moving inwardly to a turnaround point 125. The XYZ relative linear movements and the AC relative rotational movements are all coordinated to move the wirelaying tool 30 smoothly over the surface of the fitting 10. In this spiral pattern, the cutting tip 31 (see FIG. 2) traces an arcuate path of a steadily decreasing radius about a notional center point or central axis of the spiral, until the inward spiral is complete and it is desired to make the turnaround.

Figure 10:
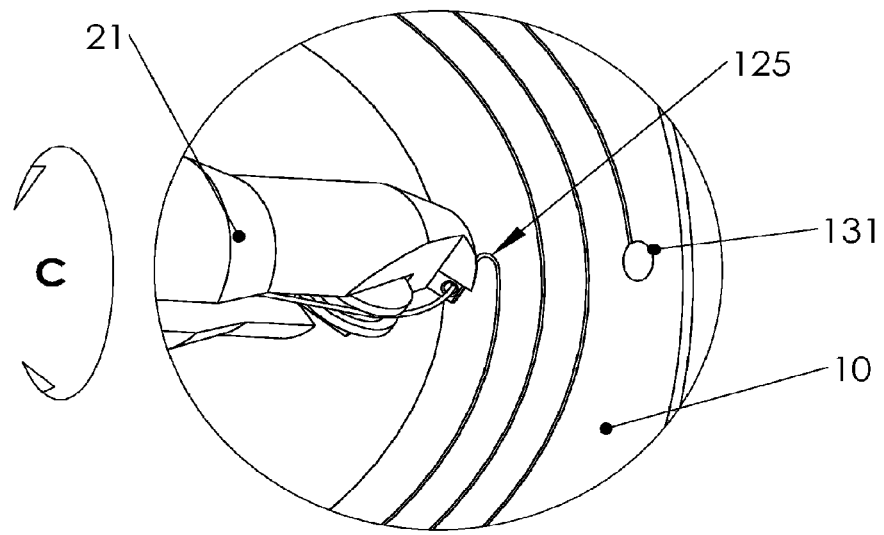

FIG. 10 is a detailed perspective view showing the apparatus while performing the turnaround. Here, the wirelaying tool 30 continues to lay the wire 12 into the fitting 10 along an arcuate path, but now with a relatively small radius about a notional central point or axis of the turn. Here, in the exemplary embodiments, a majority of the movement for the turnaround lies in the rotation of the tool arm 21 about the C axis. However, minor movements are also made, particularly in the X and Y linear axes, in order to obtain relative lateral motion between the tool 30 and the fitting 10 and thus move the cutting tip 31 along the desired arcuate path. Further minor movements are made, particularly of the Z and A axes, to allow the cutting tip 31 to remain normal to the working surface of the fitting 10 throughout the turnaround.

Figure 11:
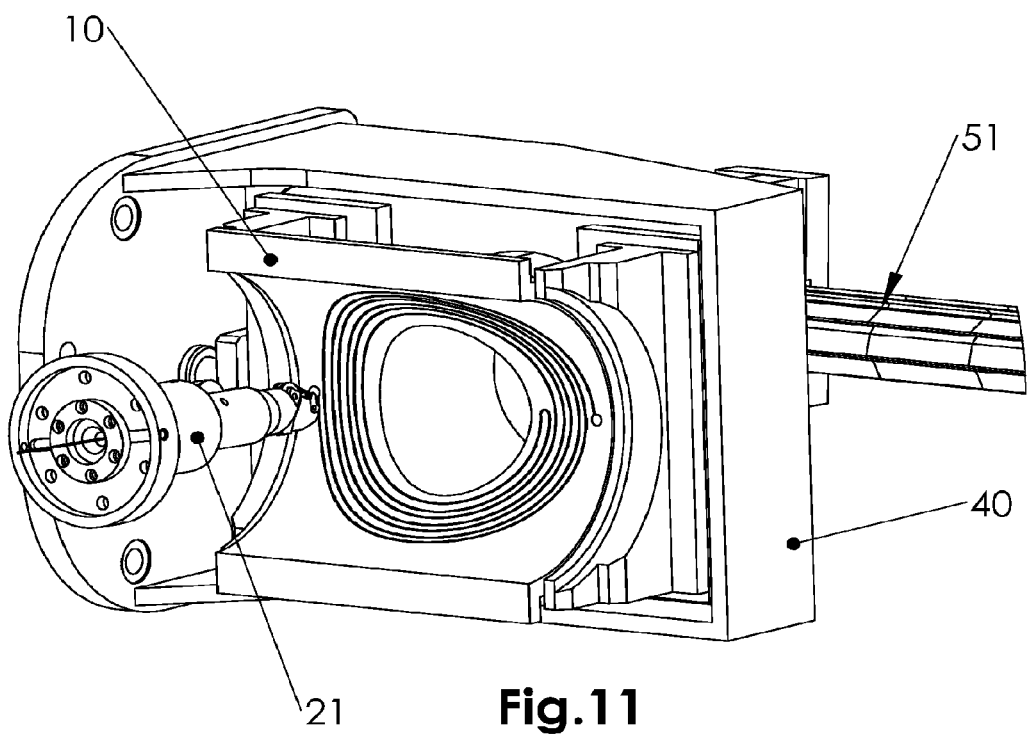

As shown in FIG. 11, relative movements of the tool 30 and the fitting 10 in the five XYC-ZA axes are continued to now form an outward spiral interleaved with the inward spiral and thus provide a complete bi-spiral wirelaying pattern into the working surface of the saddle coupler fitting 10.

Figure 12:
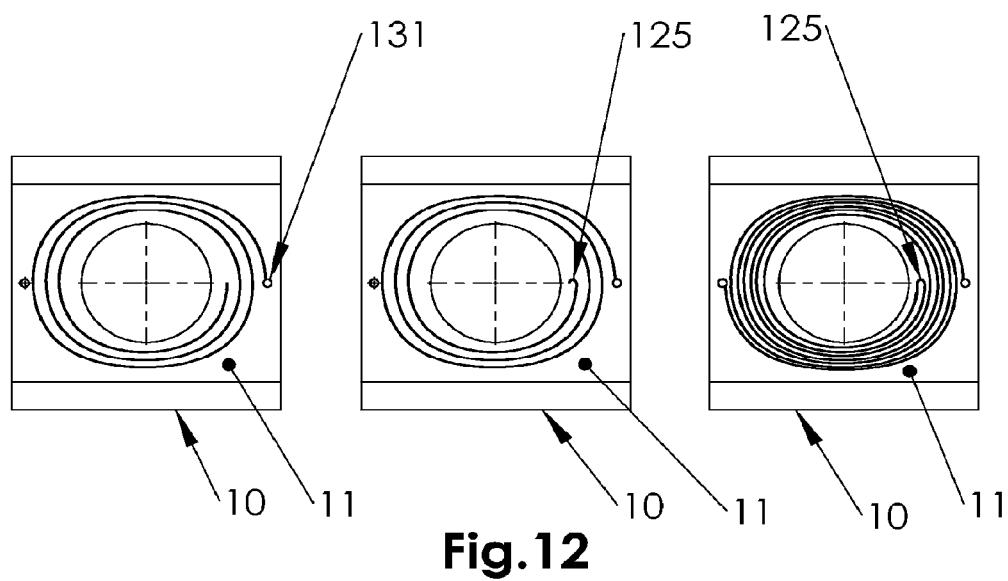
FIG. 12 is a plan view of a saddle coupler fitting during wirelaying using the second exemplary wirelaying apparatus.

FIG. 12 is a plan view of the working surface 11 of the fitting 10 showing the inward spiral, the turnaround 125 and the outward spiral being formed in sequence.

Notably, the exemplary apparatus is able to lay the wire safely and reliable even into the complex semi-cylindrical working surface 11 of the saddle coupler 10. However, the apparatus is able to lay wire into a working surface of any radius—and even into a flat working surface of infinite radius—using the configuration and movements described above. Thus, the apparatus is not restricted to producing pipe fittings and instead is suitable for a variety of other workpieces which previously were not suitable for electrofusion welding—from a flat-sided cube to a complex multi-curved component. Further, the exemplary apparatus is arranged to perform the wirelaying accurately, reliably and repeatable and on an automated or at least semi-automated industrial scale.

It will be appreciated that the wirelaying apparatus generally has a robust construction which is not prone to breakages or malfunction and which lays wire accurately and precisely according to a desired wirelaying pattern. Further, the apparatus is able to withstand the various forces—particularly lateral forces—which are applied to the tool during wirelaying, even at critical points such as the turnaround. Yet further, the wire is laid into the interior bore surface continuously throughout the wirelaying pattern and is not unduly stretched or stressed—even at the turnaround points—thus leading to safe and reliable joints when electrofusion welding is performed using the fitting.

The exemplary integrated wirelaying tool lays the wire directly into the cut through the cutting tip and thus the wire is securely embedded into the working surface. In the exemplary 35 apparatus, the wirelaying tool is a wearable component and is readily replaceable to maintain optimal performance. Also, the same type of wirelaying tool is used now for both the double wirelaying embodiment and the saddle coupler wirelaying embodiment.

The present invention extends to cover the embodiments of the wirelaying apparatus and the methods of operation of the wirelaying apparatus, as described above, and the pipe fittings or other workpieces produced by said apparatus and methods.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A wirelaying apparatus for laying a wire into a working surface of a workpiece, comprising:
    a retainer for retaining a workpiece;
    a wirelaying tool comprising:
        a cutting tip configured to make a cut in a working surface of the workpiece as the wirelaying tool is moved relative to the retainer; and
        an aperture that is configured to deliver a wire through the cutting tip directly into the cut in the working surface; and
    a tool arm including, at a distal end a tool head, the tool arm being rotatable on a longitudinal axis, the wirelaying tool being mounted to the tool head and the tool head moving the wirelaying tool relative to the retainer,
    wherein:
        the wirelaying tool is radially offset from a center of rotation about which the wirelaying tool rotates on a circular path on the tool head; and
        the cutting tip is offset from the center of rotation on a tangential line on the circular path such that the cutting tip describes an arc about the center of rotation and follows an arcuate path while laying the wire in the cut in the working surface of the workpiece.

2. The wirelaying apparatus of claim 1, wherein the retainer (1) moves on a linear Z axis relative to the tool head and (2) rotates the workpiece about a first rotational axis substantially normal to the linear Z axis.

3. The wirelaying apparatus of claim 1, wherein the tool head moves on mutually orthogonal X and Y linear axes relative to the retainer and (2) and the tool arm rotates the tool head about the longitudinal axis substantially normal to a plane formed of the X and Y linear axes.

4. The wirelaying apparatus of claim 1, further comprising:
    a wirelaying station including the tool arm; and
    a milling station including a milling cutter,
    the retainer moving the workpiece between the wirelaying station and the milling station.

5. The wirelaying apparatus of claim 1, wherein the tool head moves the wirelaying tool relative to the retainer to form a bi-spiral pattern in the working surface of the workpiece the wirelaying tool being moved (1) in an arc of decreasing radius about a notional center point to form a first spiral pattern, (2) in an arc of substantially constant radius about the notional center point to form a turnaround, and (3) in an arc of increasing radius about the notional center point to form a second spiral pattern interleaved with the first spiral pattern.

6. The wirelaying apparatus of claim 1, wherein the workpiece is a saddle coupler pipe fitting having a semi-cylindrical working surface.

7. The wirelaying apparatus of claim 1, the tool head further comprising a rotating tool holder that rotates the wirelaying tool with respect to the tool head.

8. The wirelaying apparatus of claim 7,
    wherein the workpiece is a hollow cylinder and the working surface is an interior bore surface of the hollow cylinder, and
    the tool arm supports a relative linear movement and a relative rotation of the tool head with respect to the retainer,
    wherein:
        the tool head is configured for insertion into the hollow cylinder during rotation of the hollow cylinder around a longitudinal axis of the hollow cylinder,
        the wirelaying tool is detachably mounted to the tool head,
        the cutting tip is arranged to form a cut in the interior bore surface of the hollow cylinder during the relative linear movement and the relative rotation; and
        the rotating tool holder rotates the wirelaying tool with respect to the tool head about the center of rotation such that the cutting tip describes the arc about the center of rotation while laying the wire in the cut formed in the interior bore surface of the hollow cylinder.

9. The wirelaying apparatus of claim 8, wherein:
    the tool arm is configured to perform a first relative rotation and a first relative linear movement with respect to the retainer laying the wire in the cut in the interior bore surface along a first helical path from a starting point to a turnaround point;
    the rotating tool holder rotates the wirelaying tool along the arcuate path through an angle of substantially 180°, thus laying the wire in an arc at the turnaround point; and
    the support arm is configured to perform a second relative rotation and a second relative linear movement with respect to the retainer laying the wire along a second helical path from the turnaround point back to the starting point,
    wherein the second helical path is interleaved with the first helical path to form a double helical coil configuration.

10. The wirelaying apparatus of claim 1, the wirelaying tool further comprising a body portion and the cutting tip projects from the body portion to make the cut in the working surface of the workpiece.

11. The wirelaying apparatus of claim 10, the wirelaying tool further comprising a flap closer that closes the cut thereby enclosing the wire in the cut, and the cutting tip, the body portion, and the flap closer are integrally formed.

12. The wirelaying apparatus of claim 10, wherein the cutting tip, the body portion, and the flap closer are monolithic.

13. A method for laying wire into a working surface of a workpiece, comprising the steps of:
    retaining the workpiece with a retainer;
    forming a first wirelaying pattern by opening a cut with a cutting tip of a wirelaying tool in the working surface of the workpiece by a first relative movement of the wirelaying tool with respect to the retainer, and feeding the wire directly into the cut through an aperture in the cutting tip of the wirelaying tool laying the wire in the cut in the working surface, moving a tool head carrying the wirelaying tool with respect to the retainer to change a cutting direction of the wirelaying tool while continuously laying the wire in the cut in the working surface, wherein the tool head is at a distal end of a tool arm that is rotatable on a longitudinal axis of the tool arm, and the wirelaying tool is radially offset from a center of rotation about which the wirelaying tool rotates on a circular path on the tool head, rotating the cutting tip around the center of rotation from which the cutting tip is offset on a tangential line on the circular path such that the cutting tip describes an arc and follows an arcuate path around the center of rotation while laying the wire into the working surface; and forming a second wirelaying pattern by a second relative movement of the workpiece with respect to the wirelaying tool.

14. The method of claim 13, wherein the second wirelaying pattern is interleaved with the first wirelaying pattern and the change of direction reverses the cutting direction of the wirelaying tool.

15. The method of claim 13, a bi-spiral wirelaying pattern is formed in a saddle coupler workpiece, the step of forming the first wirelaying pattern including moving the wirelaying tool in an arc of decreasing radius about a notional center point to form a first spiral pattern;

the rotating step including moving the wirelaying tool in an arc of substantially constant radius about the notional center point to form a turnaround; and the step of forming the second wirelaying pattern including moving the wirelaying tool in an arc of increasing radius about the notional center point to form a second spiral pattern interleaved with the first spiral pattern.

16. The method of claim 13, further comprising closing the cut in the working surface with a flap closer on the wirelaying tool to enclose the wire in the cut in the working surface.

\* \* \* \* \*